Figure 1:
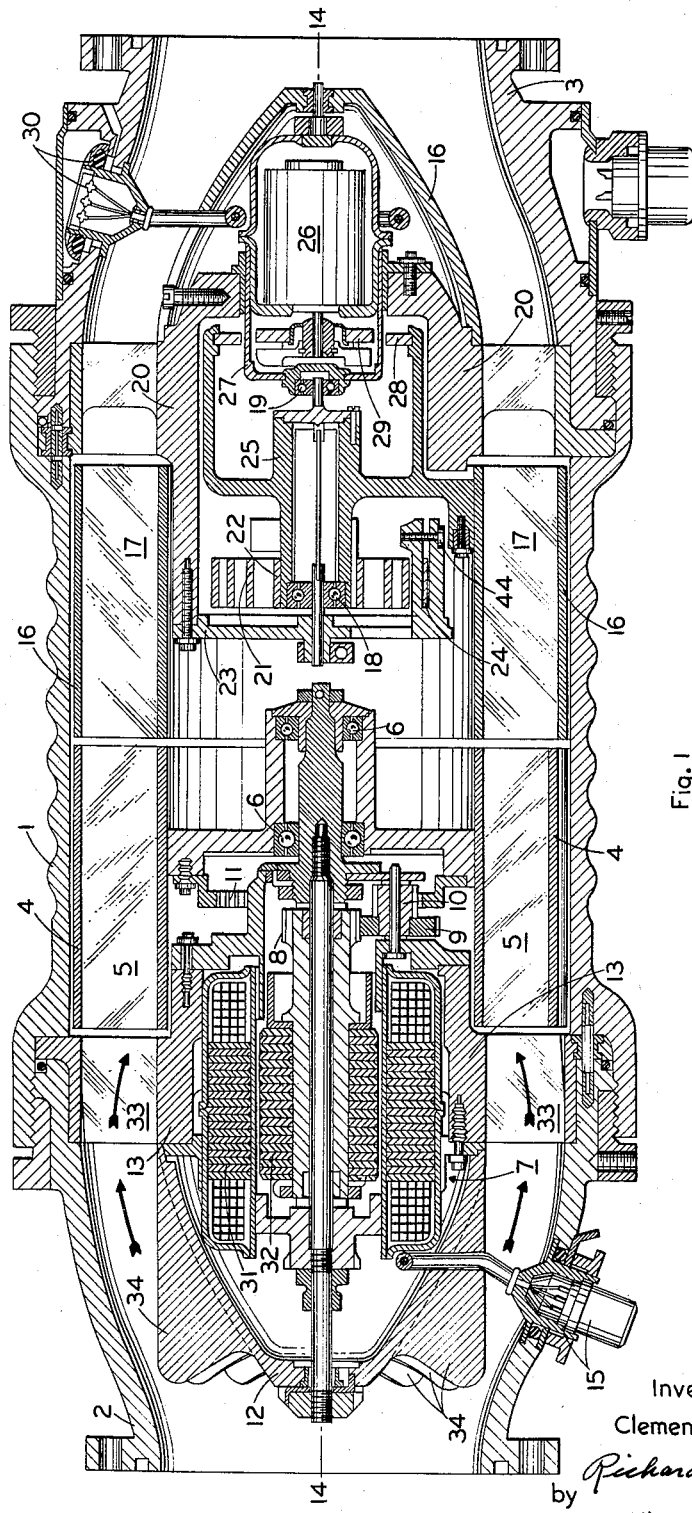

Oct. 6, 1959  C. F. TAYLOR  2,907,208
MASS FLOWMETER MOTIVE APPARATUS
Filed Dec. 20, 1956  2 Sheets-Sheet 2

Inventor:
Clement F. Taylor
by Richard E. Horley
His Attorney

United States Patent Office 2,907,208
Patented Oct. 6, 1959

2,907,208

MASS FLOWMETER MOTIVE APPARATUS

Clement F. Taylor, Lynn, Mass., assignor to General Electric Company, a corporation of New York Application December 20, 1956, Serial No. 629,697

9 Claims. (Cl. 73—194)

The present invention relates to improved fluid flowmeters and, more particularly, to mass flowmeters of the impeller-turbine type wherein impeller motive power requirements are minimized.

In the measurement of fluid flow in terms of its mass, rather than volume, it has been found that accurate indications, without compensations for density and viscosity variations, may be realized through use of detectors each including an upstream driven impeller and a downstream reaction turbine, the fluid impeller being actuated by a constant speed motor. An axial-flow mass flowmeter, for example, may include a hollow cylindrical casing in which is positioned an upstream cylindrical impeller which has longitudinal peripheral slots and is rotated at a substantially constant speed such that fluid flowing through it has a substantially uniform linear speed of motion imparted to it in an angular direction about the longitudinal axis of the impeller. A cylindrical reaction turbine element is provided in proximate collinear downstream relationship to the impeller and is likewise constructed to have longitudinal peripheral slots to accommodate fluid flow. Torques tending to deflect the turbine angularly are sensed as being characteristic of the mass of fluid flow per unit of time. Any deviations from uniformity of speed of the motor rotating the impeller result in erroneous measurements and, while small discrepancies are tolerable in most instruments, optimum performance dictates that the impeller drive motor have sufficient power to maintain constancy of speed despite wide ranges of flow variations, both transiently and more slowly. This requirement in turn demands that the motive power source be of relatively large capacity, such that weight, bulk and complexity are likewise greatly magnified. When it is appreciated that in certain applications mass flowmeters of this type are called upon to conduct and measure precisely all of the liquid flowing within ranges up to five tons per minute, it will be readily understood that the driving power requirements are severe indeed. And, as those experienced with aircraft instrumentation requirements are aware, compactness, simplicity, and minimized weight are essential in airborne flowmetering devices.

Accordingly, it is one of the objects of the present invention to provide improved mass flowmeter apparatus wherein ranges of flow measurement are greatly extended without comparable increases in size, mass, and capacity of motive equipment.

Further, it is an object to provide an improved mass flowmeter constant-speed impeller drive arrangement wherein an electric impeller motor cooperates with a static fluid-deflection and turbulence-removing structure to achieve operation over a wide range of mass flow rates.

By way of a summary account of this invention in one of its aspects, an axial-flow mass flowmeter of the aforementioned construction is equipped with a synchronous electric motor housed within a streamlined upstream bracket coaxially with the outer cylindrical casing, an annular space of about the same radial dimensions as the impeller slots appearing between the bracket and housing. The electric motor seeks to preserve a constant speed of rotation of the impeller, under influence of its substantially constant-frequency source of electrical power, although the loading at ever higher flow rates tends to disrupt synchronism and occasion stalling. Immediately upstream of the impeller, however, there are disposed substantially radial planar vanes fixed intermediate the streamlined bracket and outer casing, these vanes being skewed or twisted out of parallelism with the longitudinal axis of rotation of the impeller and in a direction to deflect the fluid flow against the impeller slot partitions such that the impeller tends to be driven in the same angular direction as it is driven by its electric motor. These upstream fixed vanes, which are numerous, support the upstream bracket and are made thin to minimize the introduction of turbulences. The number and spacing of these vanes differ from the number and spacing of the impeller slot partitions, whereby certain undesirable oscillations are avoided. Upstream of these skewed vanes, which are precision-formed to impart predetermined fluid movements, there is a like number of bracket-supported straightening vanes of less precise manufacture, these straightening vanes being angularly staggered in relation to the skewed vanes.

Figure 2:
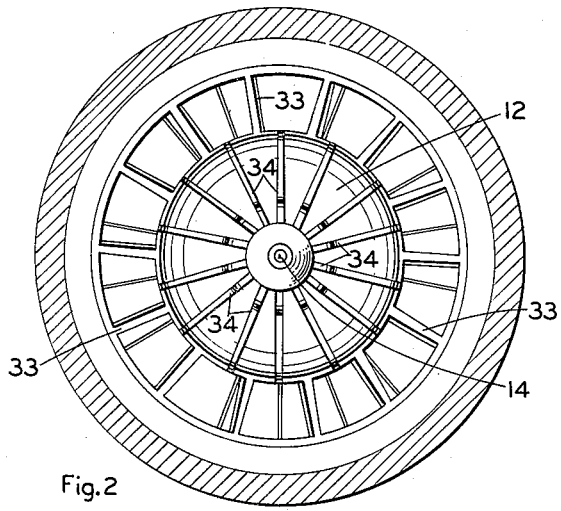
Figure 4:
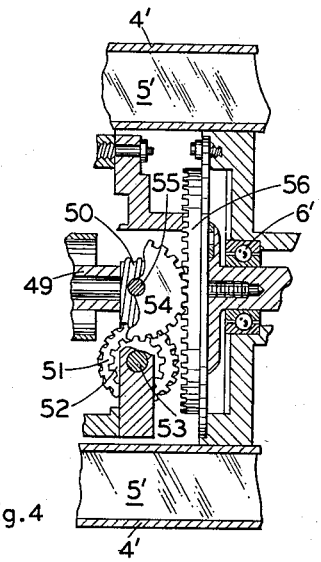
Figure 3:
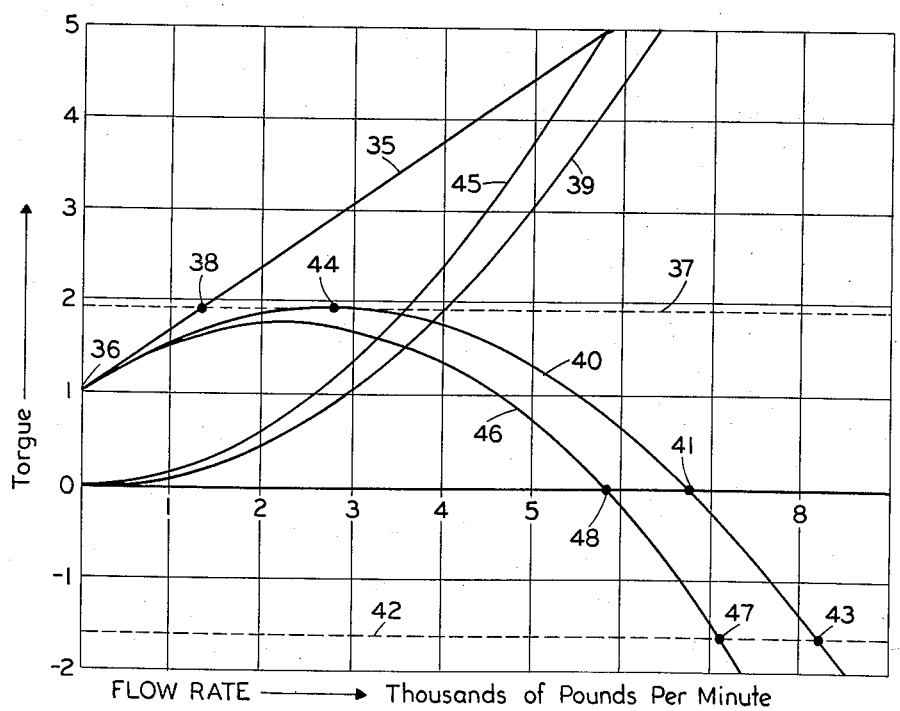

Although the features of this invention which are believed to be novel are set forth in the appended claims, further details of the invention, and additional objects and advantages thereof, may be most readily understood through reference to the following description taken in connection with the accompanying drawings, wherein:

Figure 1 is a longitudinal cross-section of a mass rate flow detector embodying teachings of this invention;

Figure 2 provides an end view of portions of the upstream fluid assist arrangement shown in Figure 1;

Figure 3 presents comparative plots of impeller motor torque and current vs. mass rates of flow for unimproved and improved flowmeters; and Figure 4 illustrates, in a partial cross-sectional view, another impeller drive mechanism advantageous in certain applications.

With reference to Figure 1, there is shown a flow detector for the measurement of the mass of fluid flow per unit of time, including a cylindrical outer casing 1 through which fluid flows from an upstream inlet 2 to a downstream outlet 3. Flowmeters of this axial-flow type may include an upstream cyclindrical impeller 4 which has longitudinal peripheral slots separated by equally-spaced partitions 5 and which is mounted on bearings 6 for rotation by a constant speed motor 7 through gears 8, 9, 10, and 11. Upstream bracket 12, of streamlined symmetrical configuration, is supported coaxially within the casing 1 by its multi-vaned member 13, which is discussed more fully hereinafter, and provides support and enclosure for certain of the motive members. Fluid flowing through the straight peripheral slots of impeller 4 has imparted to it a substantially uniform linear speed (angular velocity × radius) of motion in an angular direction about the longitudinal axis 14—14 of the impeller. This uniform linear speed of motion of the impeller and fluid, which is in a clockwise direction as viewed from the upstream end of the detector, is occasioned in part by the constant speed synchronous drive motor 7 which receives constant frequency electrical excitation from an A.-C. source via the electrical connector 15. A cylindrical turbine element 16 is likewise constructed to have straight longitudinal peripheral slots separated by partitions 17 and accommodating flow of all the fluid passing through the detector. Axis 14—14 is coincident with the axis of angular movement of turbine element 16 on its support bearings 18 and 19 positioned by portions of the downstream bracket assembly 20. Angular restraint of turbine 16 is principally achieved through a resilient spiral spring 21 which has one end 24 fixed with bracket extension 23 and its opposite end 22 fixed with the hollow turbine shaft 25. Angular deflections of turbine 16 are in proportion to the mass rate of fluid flow through the detector per unit of time.

Flowmeters of the foregoing construction may either actuate remote indicators or provide output signals for control initiation purposes, in known ways. In the apparatus of Figure 1, an electrical signal generator 26 yields an appropriate output responsive to angular movements of turbine 16 which are communicated to it through the non-magnetic sealed wall 27 by the turbine magnets 28 and follower magnets 29. For example, signal generator 26 may comprise a position-telemetering transmitter which is coupled with a position telemetering receiver by way of connector 30, such that a remote dial, pointer, or other device is actuated, or it may comprise a generator of signals which may be delivered to a totalizing servo system.

If desired, further details of flowmeter constructions in certain respects similar to that thus far described may be observed in the disclosures of U.S. Patent No. 2,714,310 for "Mass Rate Flowmeter" assigned to the same assignee as that of the present application.

As has been indicated earlier herein, the electric motor 7 may in some instances be required to deliver a very sizeable power output, as when the fluid flow through the impeller slots is of the order of tons per minute. The torques developed between the electric motor stator 31 and rotor 32 must then be extraordinarily large to continue the impeller rotation at the predetermined substantially constant speed which is essential to proper operation and accuracy of the flowmeter. If a physically small motor is relied upon to serve this purpose unaided, such that it may be conveniently mounted within the detector in a non-obstructing location, as illustrated, the motor tends to overheat, lose synchronism, stall, or fail. Substitution of a larger and more powerful electric motor adds undesirably to the bulk and weight, and may occasion a complex and cumbersome design wherein the larger motor must be placed outside the cylindrical confines of the outer casing 1. Space limitations will be appreciated when it is noted that a flowmeter such as that of Figure 1 may be rated to pass 10,000 pounds per minute through the casing 1 having an inner diameter of only about six inches.

In accordance with my invention, however, the drive motor torques are not caused to increase in the expected manner in proportion to the increases in fluid mass flow rates, and, instead, the impeller is caused to function in part as a turbine such that the drive motor load may actually be at a substantially zero level at certain flow rates over the flow rate ranges to be experienced. The turbine effect is occasioned by cooperation between the multiple skewed vanes 33 of the upstream bracket member 13 and the slot partitions 5 of impeller 4. Figures 1 and 2 disclose that these essentially radial and thin vanes 33 are planar but out of parallelism with the longitudinal axis 14—14 by about 1½ degrees. As viewed from the upstream end of the detector, which is the view in Figure 2, these fourteen vanes are perceived to be skewed or displaced in a clockwise direction, whereby the fluid flowing through the detector has a clockwise angular movement imparted to it. When this fluid next impinges upon the impeller partitions, 5, the impeller is further urged to rotate in the same angular direction as it is driven by its motor 7. Over a limited range, increasing rates of mass flow result in increased fluid assistance to the impeller motor in this manner. To realize optimum performance, it is found that the vanes 33 should be very precisely formed. The amount of skewing is thereby closely controlled, and turbulences are not introduced. Because of the precision which thus enters into the manufacture of the skewed vane member 13, it has been found advantageous to limit the blade length to the minimum value necessary to achieve the desired angular movements of the fluid. The vanes 33 may then be of insufficient length to accomplish needed flow straightening and elimination of turbulences. For the latter purposes, a separate set of vanes, 34, is provided just upstream of the skewed vanes 33. Straightening vanes 34 are present in the same number as skewed vanes 33, although the two sets of vanes are staggered or out of correspondence in their angular relationships with one another. Vanes 34, which are fixed with upstream bracket 12, serve principally to minimize fluid turbulences, and are of necessary length to insure that this end is accomplished. An important advantage accrues from the fact that vanes 34 may be of a relatively non-precise construction which would tend to introduce slight twisting of the fluid in different angular directions and by different amounts. Such fluid twisting effects are removed by the downstream skewered vanes 33. However, these combined influences are most satisfactory principally because the two sets of vanes 33 and 34 are out of angular correspondence. Were they angularly aligned, then the non-precise straightening vanes could occasion undesired turbulences where the vane ends are proximate, and the net skewing effects could be of less than the optimum values. I have also found it desirable to select a number of impeller slot partitions which is different from the number of skewed and straightening vanes. If they are of like number and equal angular spacing, the impeller motive torques evidence unwanted periodic peaks which occur whenever the impeller slot partitions are aligned with the downstream ends of the skewed vanes. Such peaked torques tend to set up undesirable vibrations as well as locking effects tending to stall the electric drive motor. The illustration of Figure 2 portrays these relationships, the vanes 34 and 33 numbering fourteen and the slot partitions 5 being eighteen in number.

Operating effects are clarified through reference to the plots of Figure 3 wherein representative proportioned values of electric motor torque are presented against an abscissa in terms of thousands of pounds of fluid flow per minute. The total torque load on the electric motor involves one component imposed by the fluid to which angular momentum is being imparted and another component imposed by losses such as bearing and gear frictions. Both of these torque load components are reduced or entirely overcome by the skewed vane assembly which causes the impeller to function both as an impeller and as a fluid reaction turbine. Linear curve 35 represents the aforesaid total torque load, it being noted that at the zero flow point 36 there is a net torque occasioned by losses. Maximum flow capacity of a flowmeter lacking the improvements presently taught is that for which the required total torque equals the available motor torque, and if dashed-line level 37 of the torque represents the latter torque, then the maximum flow capacity at point 38 would be about 1.3 thousand pounds per minute. With the skewed vane assembly functioning upstream to twist the flowing fluid about the axis of impeller rotation, and in the same angular direction as that in which the electric motor drives the impeller member, the impeller member derives a torque because of its action as a fluid reaction turbine. For a fluid of a maximum density, this reaction torque derived from the fluid may be represented by curve 39. The corresponding drive motor torque required with the fluid of this density then is expressed by curve 40. At increased flow rates, the torque derived from the fluid twisted by the skewed vanes becomes larger than the total torque load, such that curves 35 and 39 cross (not shown), this condition being one at which the drive motor torque 40 crosses the zero torque level at point 41 and the drive motor has zero loading. At still higher flow rates, the drive motor must act as a brake by imposing torques on the combination turbine-impeller member to cause it to maintain a constant speed of rotation, else it would speed up. The braking torques are shown as negative torques beyond point 41 on curve 40. If the drive motor torques in this reverse or braking direction cannot exceed the negative torque level 42, then the crossover 43 between curves 42 and 40 represents the maximum flow rate accurately measurable with the particular flowmeter under consideration and with a maximum density fluid. Uniquely, maximum drive torque in the positive direction is experienced at point 44, rather than at a maximum flow rate value. With fluids of a minimum density to be measured by the flowmeter, the reaction torque curve 45 and drive motor torque curve 46 are applicable, the maximum flow rate accurately measurable being found at point 47. The maximum positive and negative drive motor torques available will in part govern the ranges of flow rates which are measurable and the ranges of fluid densities which may be tolerated. The skewing angles of the upstream fluid-deflecting vanes should be optimized to meet specific design requirements. If the drive motor is one which applies only positive torques, in one direction, such as a centrifugal governor controlled motor which is de-energized when it tends to exceed a certain fixed speed, then the maximum flow capacity is low, as at point 48, and should not be exceeded for precise flow metering. Preferably, however, the electric drive motor exerts torques both to drive at a fixed speed or to restrain rotation to this fixed speed, and a common synchronous A.-C. electric motor possesses such desirable characteristics. Maximum flow capacity with the latter motor is then increased to point 47, as has been described.

Flowmeter characteristics may be rendered wholly independent of drive motor reverse or braking torque capacity through use of a self-locking mechanism in the motive system. Such a mechanism is of a unilaterally-transmitting type wherein torques are freely transmitted from the electric motor to the combined turbine-impeller member, although torques cannot be passed in the reversed direction from the latter to the former. Various devices such as escapements and pawls answer this purpose, and a worm drive is particularly advantageous in that it also provides a desirable speed reduction in certain applications. This arrangement is depicted in Figure 4 wherein a partial sectioned view of apparatus such as that of Figure 1 appears, corresponding parts being identified by the same reference characters with distinguishing prime accents. The combined turbine-impeller member 4' is there driven by the electric motor shaft 49 through the gear train in which the power flow is traced from worm gear 50 to the intermeshing worm wheel 51 and to the attached pinion 52 which rotated with worm wheel 51 on rotatable shaft 53. Pinion gear 54 receives torques from pinion 52 and, in rotating on its shaft 55, transmits power to the annular face gear 56 attached to the rotatable turbine-impeller member 4'. As the turbine action resulting from influence of upstream skewed vanes seeks to increase the speed of the motor drive shaft 49 beyond the predetermined value regulated by the electric motor, the worm gear 50 and worm wheel 51 lock and restrain increases in speed. The electric motor thus operates against reduced or zero loads, but not against torque loads of reversed sense. To some extent a like effect may be realized with conventional gearing wherein the speed reduction is large, such that very sizable reverse torques would be required to reflect undesirable accelerating torques on the motor.

It has been known heretofore to utilize a flow metering turbine which itself has skewed vanes or fluid passages and which rotates at speeds representative of the flow. The present invention is such that this practice cannot be followed, for if the combined turbine-impeller member has skewed vanes or flow passages it will either function as something other than a true mass flowmeter or will have none of the motive power advantages characterizing this invention. With wholly skewed fluid passages, the turbine-impeller member tends to act as a volumetric flowmeter, and if it is further driven at a constant speed, the fluid discharged downstream into the measuring turbine will introduce errors due to the fluid twisting. If, on the other hand, the fluid passages are straight and aligned with the axis of rotation downstream while being skewed or twisted upstream, the fluid discharged may have a uniform angular velocity, but there will be no reduction of motive power because such momentum as the fluid applies to the impeller will be wholly removed in the aligned downstream portions of the impeller passages. Thus, it is essential that the upstream fluid twisting be accomplished by twisting means which are not fixed to the turbine-impeller member. When the twisting means is in the form of upstream stationary skewed vanes fixed to the flowmeter casing, the fluid reaction forces occasioned upon its being twisted are then transmitted only to the supporting casing, where they are dissipated without deleteriously affecting the flowmeter operation. The skewed vane skewing angle may of course be made adjustable. And, in some applications it may be desirable for the skewed vanes to have flexibility due to resilience, such that the skewing angle will alter to lessened values automatically with increased flow, whereby the motive assistance is greater at low flow rates, where most needed, and less at high flow rates where it tends to introduce large reverse torques.

The combined turbine-impeller member, 4 and 4' in Figures 1 and 4, respectively, functions as a "controller" of the linear speed of the fluid discharged therefrom about its axis of rotation. As has been noted, it may not function as a true "impeller" at all times because of the more pronounced operation as a reaction turbine. It is important, however, that this member serve to maintain the aforesaid linear speed of its discharged fluid at a uniform value, and in this connection it is necessary for the fluid passages therein to be accurately aligned with the axis of rotation, at least at their downstream ends. In the illustrated collinear array of a turbine-impeller member and a downstream turbine, this means that the turbine-impeller member longitudinal peripheral slots and the partitions between them should be straight and parallel with the axis of rotation. In another construction, a radial one wherein the turbine-impeller member has radial fluid passages and the associated annular downstream turbine member is in a surrounding coaxial array, the turbine-impeller member passages should be radially aligned accurately with the axis of rotation. The fluid passages of the turbine-impeller member should in any embodiment be of sufficient length and of a sufficiently small cross-section to insure that all of the flowing fluid is brought to a uniform linear speed about the axis of rotation before being discharged downstream into the downstream turbine. Similarly, the upstream skewed vanes should be disposed close enough to one another to insure that the flowing fluid is angularly twisted in the required manner.

For a given electric drive motor, range of fluid densities, and impeller speed of rotation, the optimum angle of skewing for the substantially planar vanes 33 in relation to the impeller axis of rotation is that for which the available positive drive motor torque will be at least equal to the greatest difference between the total required torque and the impeller torque derived from the twisted fluid. Thus, referring to Figures 1 and 3, the vanes 33 are skewed in the direction of impeller rotation such that at point 44 the member 4 will have enough torque applied to it by the twisted fluid to make up the difference between the total torque required and the maximum motor torque available. Mathematically, the optimum skewing angle, for the Figure 1 equipment finds expression in this relationship:

$$\tan \theta = 1.21 \frac{\rho_0 W R g A}{M s}$$

where:

$W=$ optimized impeller speed,
$Rg=$ radius of gyration of impeller flow passages,
$A=$ total area of impeller flow passages,
$\rho_0 = 0.415 \rho_1 (1+\sqrt{1+\rho_2/\rho_1})$ where $\rho_1=$ minimum fluid density and $\rho_2=$ maximum fluid density, and
$Ms=$ maxium flow rate;

the units for these quantities being those of any consistent unit system. An optimum angle of 1.7 degrees was calculated for a flowmeter like that of Figure 1, with an angle of 1.5 degrees being applied in practice as a result of tests confirming this design.

With a fluid density variation of 10% the flow capacity of my improved flowmeters may be increased beyond that of unimproved versions by a multiplying factor of 3.6, for example, even with a drive motor having no appreciable braking torques. If impeller speed rather than flow capacity is to be increased, my skewed vane arrangement enables a multiplication by 1.9 under the same conditions.

The specific embodiments of the invention herein disclosed are, of course, of a descriptive rather than a limiting nature, and various changes, combinations, substitutions, or modifications may be employed in accordance with these teachings without departing either in spirit or scope from this invention in its broader aspects.

What I claim as new and desire to secure by Letters Patent of the United States is:

1. A fluid mass flowmeter comprising a mass flow detector having a fluid-tight casing adapted for coupling into a fluid flow path, a reaction turbine and impeller member mounted for rotation within said casing about an axis and having a plurality of straight fluid-conducting passages therethrough separated by partitions, motive means for rotating said member about said axis at a substantially constant speed, restrained turbine means mounted within said casing in proximate downstream relationship to said member for angularly decelerating fluid discharged from said passages, a plurality of vanes mounted within said casing in a proximate upstream relationship to said member and disposed to remove turbulence from said fluid and to direct flowing fluid onto said partitions in the direction of rotation of said turbine and impeller member, said passages being dimensioned to provide all of the fluid discharged therefrom with a uniform linear speed about said axis, and measuring means responsive to torques experienced by said turbine means about its axis.

2. A fluid mass flowmeter comprising a mass flow detector having a fluid-tight casing adapted for coupling into a fluid flow path, a reaction turbine and impeller member mounted for rotation within said casing about an axis and having a plurality of straight fluid-conducting passages therethrough separated by partitions, electric motor means for rotating said member in one direction of rotation about its axis at a substantially constant speed, a restrained turbine mounted within said casing in proximate downstream relationship to said member for angularly decelerating fluid discharged from said passages, a first set of vanes fixedly mounted within said casing in a proximate upstream relationship to said member and disposed to direct flowing fluid onto said partitions to impart a torque on said turbine and impeller member in said one direction, a second set of vanes fixedly mounted in a proximate upstream relationship to said first set of vanes and out of alignment with said first set of vanes to remove turbulence from said fluid, said impeller passages being dimensioned to provide all of the fluid discharged therefrom with a uniform linear speed about said axis, and measuring means responsive to torques experienced by said turbine about its axis.

3. A fluid mass flowmeter comprising a mass flow detector having a fluid-tight casing adapted for coupling into a fluid flow path, stationary deflecting means fixed with said housing and disposed to direct fluid flowing therethrough in one angular direction about an axis, a fluid reaction turbine and impeller member within said casing rotatable about said axis in a proximate downstream relationship to said deflecting means, said member having straight fluid-conducting passages therethrough separated by partitions against which fluid acted upon by said deflecting means will impinge to apply torques to said member in said one angular direction about said axis, motive means for rotating said member in said one direction about said axis at a substantially constant speed, restrained turbine means mounted within said casing in a proximate downstream relationship to said member for angularly decelerating fluid discharged from said passages, and measuring means responsive to torques experienced by said turbine means about its axis.

4. A fluid mass flowmeter comprising a mass flow detector having a fluid-tight casing adapted for coupling into a fluid flow path, stationary deflecting vanes fixed with said casing and disposed to direct fluid flowing therethrough in one angular direction about an axis, a fluid reaction turbine and impeller member within said casing rotatable about said axis in a proximate downstream relationship to said deflecting means, said member having straight fluid-conducting passages therethrough separated by partitions extending parallel to said axis and disposed to provide that fluid acted upon said deflecting means will impinge upon said partitions and apply torques to said member in said one angular direction about said axis, electric motor means for rotating said member in said one direction about said axis at a predetermined speed and resisting rotation of said member at speeds above and below said predetermined speed, restrained turbine means mounted within said casing in a proximate downstream relationship to said member for angularly decelerating fluid discharged from said passages, and measuring means responsive to torques experienced by said turbine means about its axis.

5. A fluid mass flowmeter comprising a mass flow detector having a fluid-tight casing having a substantially cylindrical fluid chamber therein, a substantially cylindrical rotatable member within and substantially coaxial with said fluid chamber and having a plurality of fluid-conducting passages therethrough which are linear and parallel with the longitudinal axis of rotation of said member, motive means for rotating said member in one direction about said axis at a substantially constant speed, a plurality of stationary deflecting vanes fixed within said casing in a proximate upstream relationship to said member, said vanes being disposed to deflect fluid flowing therethrough in said one angular direction about said axis whereby said fluid impinges upon said member and applies torques assisting said motive means to rotate said member, restrained turbine means mounted within said casing in a proximate downstream relationship to said member for angularly decelerating fluid discharged from said passages, and measuring means responsive to torques experienced by said turbine means about its axis.

6. A fluid mass flowmeter comprising a mass flow detector having a fluid-tight casing adapted for coupling into a fluid flow path, deflecting vanes within said casing disposed to direct fluid flowing therethrough in one angular direction about an axis, a fluid reaction turbine and impeller member within said casing mounted for rotation about said axis in a proximate downstream relationship to said deflecting vanes, said member having straight fluid-conducting passages therethrough separated by partitions aligned with said axis and disposed to provide that fluid acted upon by said deflecting vanes will impinge upon said partitions and apply torques to said member in said one angular direction about said axis, an electric motor rotatable at a substantially constant speed, a unidirectional driving connection coupling said motor to said member for rotation of said member in said one direction by the motor and for preventing rotation of said motor by said member in the direction of rotation of the motor corresponding to said one direction, whereby the speed of said member is governed by said motor, restrained turbine means mounted within said casing in a proximate downstream relationship to said member for angularly decelerating fluid discharged from said passages, and measuring means responsive to torques experienced by said turbine means about its axis.

7. A fluid mass flowmeter comprising a mass flow detector having a fluid-tight casing having a substantially cylindrical fluid chamber therein, a substantially cylindrical rotatable member within and substantially coaxial with said fluid chamber and having a plurality of longitudinal peripheral fluid-conducting passages in an annular array about the longitudinal axis of rotation of said member, an electric motor for rotating said member at a substantially constant speed in one angular direction about said axis, a streamlined bracket coaxially within said casing in upstream relationship to said motor and providing support for said motor coaxially within said casing, a plurality of substantially radial vanes in an annular array intermediate said bracket and casing and supporting said bracket within said casing, said vanes being angularly spaced and twisted in relation to said axis to deflect fluid flowing therethrough in said one angular direction about said axis whereby said fluid impinges upon said member and applies torques assisting said motor to rotate said member, said motor having output torque insufficient to rotate said member at said speed at high rates of flow of said fluid without said assisting torques, restrained turbine means mounted within said casing in a proximate downstream relationship to said member for angularly decelerating fluid discharged from said passages, and measuring means responsive to torques experienced by said turbine means about its axis.

8. A fluid mass flowmeter comprising a mass flow detector having a fluid-tight casing having a substantially cylindrical fluid chamber therein, a substantially cylindrical rotatable member within and substantially coaxial with said fluid chamber and having a plurality of longitudinal peripheral fluid-conducting slots disposed in an annular array about the longitudinal axis of rotation of said member, a synchronous electric motor for rotating said member at a substantially constant speed in one angular direction about said axis, a streamlined bracket coaxially within said casing in upstream relationship to said member, said motor being nested within and supported by said bracket, a plurality of substantially radial vanes in an annular array intermediate said bracket and casing and supporting said bracket within said casing, said vanes being angularly spaced and twisted in relationship to said axis to deflect fluid flowing therethrough in said one angular direction about said axis whereby said fluid impinges upon said member and applies torques assisting said motor to rotate said member, said motor having maximum output torque insufficient to rotate said member at said speed at high rates of flow of said fluid without said assisting torques, a plurality of substantially planar radial vanes fixed within said casing upstream of said twisted vanes and angularly disposed out of coincidence with the upstream ends of said twisted vanes, restrained turbine means mounted within said casing in a proximate downstream relationship to said member for angularly decelerating fluid discharged from said passages, and measuring means responsive to torques experienced by said turbine means about its axis.

9. A fluid mass flowmeter of the angular momentum type comprising a mass flow detector having a fluid tight casing adapted to be disposed in the flow path of a fluid, an impeller and turbine member rotatably mounted within the casing and having a plurality of circularly arranged fluid conducting passages disposed concentrically of and extending parallel to the axis of rotation of said member, a synchronous alternating current electric motor for rotating said member in one direction about its axis, a driving connection coupling the motor to said member for rotation of said member in said one direction by the motor and constructed to prevent rotation of the motor by said member in the direction of rotation of the motor corresponding to said one direction whereby the speed of said member is governed by the motor, a plurality of circularly arranged substantially flat vanes disposed closely adjacent and concentrically of said member within the casing for directing fluid into the passages in said member, the vanes being of a different number than the passages in said member, the vanes further extending angularly of the axis of said member in the direction of rotation thereof by the motor and being dimensioned to effect fluid movement at a uniform linear speed whereby the fluid acted upon by said vanes will impart a substantial torque upon said member in said one direction, and means to provide a signal proportionally related to the mass of fluid flowing through the detector and the rotational speed of said member.

References Cited in the file of this patent

UNITED STATES PATENTS

| | | |
|---|---|---|
| 1,974,857 | Winton | Sept. 25, 1934 |
| 2,146,827 | Kruspi | Feb. 14, 1939 |
| 2,326,169 | Piquerez | Aug. 10, 1943 |
| 2,714,310 | Jennings | Aug. 2, 1955 |

FOREIGN PATENTS

| | | |
|---|---|---|
| 717,897 | Great Britain | Nov. 3, 1954 |
| 765,206 | Great Britain | Jan. 2, 1957 |